United States Patent [19]

France

[11] Patent Number: 4,863,237

[45] Date of Patent: Sep. 5, 1989

[54] SURFACE TREATMENTS FOR OPTICAL FIBRE PREFORMS

[75] Inventor: Paul W. France, Woodbridge, England

[73] Assignee: British Telecommunications Public Limited Company, United Kingdom

[21] Appl. No.: 140,620

[22] Filed: Jan. 4, 1988

Related U.S. Application Data

[62] Division of Ser. No. 106,879, Oct. 13, 1987, abandoned.

[30] Foreign Application Priority Data

Oct. 14, 1986 [GB] United Kingdom ............... 8624699

[51] Int. Cl.$^4$ ............................................. G02B 6/00
[52] U.S. Cl. ................................................. 350/96.34
[58] Field of Search ............... 350/96.30, 96.31, 96.33, 350/96.34

[56] References Cited

U.S. PATENT DOCUMENTS

| | | | |
|---|---|---|---|
| 4,381,141 | 4/1983 | Sakuragi et al. | 350/96.34 |
| 4,733,940 | 3/1988 | Broer et al. | 350/96.34 X |
| 4,737,012 | 4/1988 | Murakami et al. | 350/96.30 X |

FOREIGN PATENT DOCUMENTS 3101999 11/1981 Fed. Rep. of Germany .

OTHER PUBLICATIONS

Chemical Abstracts, vol. 95, No. 16, Oct. 1981, p. 278, Abstract 137155k (Furukawa Electric) Chemical Abstracts, vol. 99, No. 20, Nov. 1983, p. 272, Abstract No. 162918b (Nippon Telegraph & Telephone Public Corp.).
Proceedings, Third International Symposium on Halide Glasses, Jun. 24-28, 1985, Nakata et al., "Halide Glass Fibers with a Protective Chalcogenide Glass Jacket".
Chemical Abstracts, vol. 99, No. 20, Nov. 14, 1983, p. 272, Abstract 162918b, Columbus, Ohio, U.S.: & JP-A-58 95 265 (Nippon Telegraph and Telephone Public Corp.).
Chemical Abstract, vol 95, No. 16, Oct. 1981, p. 278, Abstract 137155k, Columbus, Ohio, U.S.; & JP-A-81 50 307 (Furukawa Electric).

Primary Examiner—William L. Sikes
Assistant Examiner—Phan T. Heartney
Attorney, Agent, or Firm—Nixon & Vanderhye

[57] ABSTRACT

Halide fibers are protected by coatings up to 2μm thick of chalcogenide glasses, e.g. glasses based on compounds of S, Se or Te with Ge or As. The coatings are deposited on the fiber preform by ion deposition sputtering. Preferably the preform is etched by directing a stream of inert ions at it. Most suitably the etching immediately precedes the coating.

11 Claims, 1 Drawing Sheet

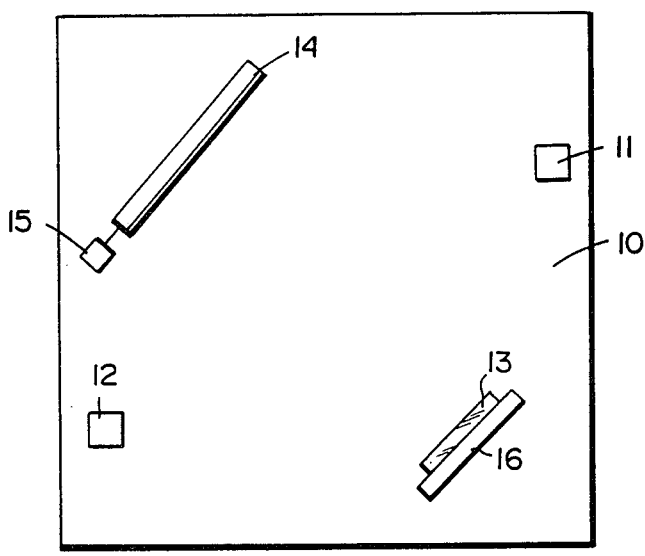

SURFACE TREATMENTS FOR OPTICAL FIBRE PREFORMS

This is a division of application Ser. No. 106,879 filed 13 Oct. 1987, now abandoned.

This invention relates to surface treatments for optical fibre, and in particular it relates to a new treatment for the surface of optical fibres and fibre preforms made of halide glasses.

Halide glasses are well known both as compositions per se and specifically for use as optical fibre. The glasses comprise amorphous mixtures of the halides of metals and most of the metallic halides have been reported as constituents.

For the making of optical fibres, the elements Ba, La, Al, Na, Li, Pb and especially Zr and/or Hf have proved particularly suitable. The halide component of the glass is almost always fluorine but chlorine has also been proposed, usually as fluoride/chloride mixtures.

The conventional method of making the fibres comprises enclosing a rod of one halide glass in a tube of a different halide glass to give a preform which is drawn, e.g. 80:1, to give the fibre.

The halide glasses, and hence fibres made of them, are liable to decomposition caused by moisture in the atmosphere. It has therefore been proposed to apply barrier coatings to protect the halide glass. Thus a paper presented at the Third International Symposium on Halide Glasses, held at the Universite de Rennes 1, France during the period 24–28 June 1985 by A Nakata, J Lau and J D Mackenzie suggests the chalcogenide glasses for this purpose. These authors propose two methods of preparing the coated fibre. They propose enclosing a billet as described above in a third tube of chalcogenide glass or dipping the bilet into the molten chalcogenide glass.

This invention relates to a new method of treating the surface of a halide glass article, e.g. a preform for drawing into an optical fibre. More specifically it includes:

(a) A method of dry etching the surface of the article, eg to remove contamination.

(b) Applying a coating of protective material, eg a chalcogenide glass to the surface of the article by ion sputtering deposition. The preferred chalcogenide glasses are based on compounds of S and/or Se and/or Te.

(c) A sequence in which (a) is carried out as a preparation for (b).

The dry etching specified in (a) is carried out by directing a stream of inert ions directly at the surface of the shaped article. This removes a thin surface layer and hence it removes surface contamination. The dry etching offers several benefits, eg it tends to promote the adhesion of subsequently applied coatings and, where the shaped article is a fibre preform, it appears to have a beneficial effect on the strength fibre. It is an important advantage of this technique that only inert reagents, ie the ions, are used. Thus there is very little risk that the etching will cause unwanted reactions with the fluoride glass. It is emphasised that the removal of surface contamination is, in itself, a substantial benefit because the contaminants could undergo adverse reactions with the substrate. Overcoating contaminants would merely trap them in contact with the substrate.

Both the deposition and the etching are carried out under high vacuum. Since both are highly directional it is desirable to rotate the shaped article during processing.

The combination specified in (c) is a preferred embodiment when the two stages (a) and (b) are carried out without breaking the vacuum in which both stages are performed. This minimises the risk of recontamination between steps (a) and (b).

Ion sputtering deposition, specified in (b), is an established coating technique; suitable equipment is commercially available. In a form suitable for carrying out this invention, the deposition comprises directing a stream of inert ions, e.g. argon ions, at a target of the chalcogenide glass whereby a secondary stream of particles is generated from the target and exposing the shaped article to said secondary stream. The primary stream preferably has an energy of 100 to 1000 eV and the preferred flow rate is equivalent to 10 to 500 mA. If very prolonged exposures are acceptable coatings up to 10 $\mu$m thick, or even up to 50 $\mu$m thick, may be applied to the surface of a shaped article. For shorter durations, such as 1 hour to 5 minutes, it is usually convenient to aim for thinner coating, eg up to 1 $\mu$m thick.

The chalcogenide glasses particularly suitable for use as the target are those consisting of a plurality of compounds containing the elements (and especially only the elements) S, Se, Te, Ge and As; wherein said glass contains at least one of S, Se and Te and at least one of Ge and As. Chalcogenide glasses which additionally contain halides, eg up to 10 mole % of I or Br, are also suitable.

The halide glasses include the conventional glasses identified above. We have found that compositions which contain at least 40% mole of $ZrF_4$ or at least 50 mole % of $ZrF_4 + HfF_4$ are particularly suitable for forming optical fibres. The balance of the composition is constituted by fluorides such as those of Ba, La, Al, Na, Li and Pb. The ratios are adjusted to provide desired properties, e.g. refractive index. A glass fibre normally comprises two compositions, i.e. one for the core and one for the cladding. The method of the invention is applicable to coating the conventional halide glasses and hence fibres prepared from them.

The coated preforms, obtained as described above, can be regarded as having alternative utilities. These are:

(i) As protection for the preform during subsequent handling of the preform, eg by preventing contact between air and a halide glass.

(ii) As a primer for further coating, eg the subsequent enclosing of the preform in a tube of chalkogen glass as described by Nahata, Lau and Macenzie.

(iii) For direct drawing to optical film.

Thus the invention comprises a method of making coated optical fibres which method comprises coating with chalcogenide glass a fibre preform having a core precursor of one halide glass and a cladding precursor of a different halide glass said coating being carried out as described above. After coating the preform may be drawn to an optical fibre. The drawing ratio, ie the ratio:

(Diameter of the preform) : (Diameter of the fibre) is conveniently 30:1 to 160:1.

The invention also includes halide glass fibre preforms and optical fibres, e.g. monomode of multimode, which have thin barrier coatings of chalcogenide glass. In the case of fibre, the coating has a thickness of not more than 2 $\mu$m, for instance 0.1 to 500 nm, preferably 2 to 100 nm. The fibres are usually 50 $\mu$m to 500 $\mu$m thick. In the case of preforms the coatings are less than 50 μm thick, preferably less than 10 μm thick.

The invention will now be described by way of example with reference to the accompanying drawing which shows, in diagrammatic form, an ion sputtering apparatus typical of commercially available equipment.

The apparatus comprises a vacuum chamber 10 which contains two ion sources 11 and 12 each of which is adapted to produce colliminated beam of argon ions. Source 11 is directed at a substrate zone which, in use, is occupied by a cylindrical fibre preform 14. Source 12 is directed at a target holder 16 which, in use, supports a chalcogenide glass source 13. The substrate 14 is supported by a motor 15 which, in use, rotates a cylindrical preform about its longitudinal axis.

The commercial equipment comprises various auxiliaries not shown, e.g. vacuum pump, fibre thickness monitors, shutters, gas analysers, heaters and/or coolers, instrumentation to measure ion energies and ion flow rates (equivalent to electric current).

The etching and coating of a fibre preform in accordance with the invention will now be described.

The cylindrical preform is attached to motor 15 as shown and the selected chalcogenide glass 13 placed on target holder 16. Chamber 10 is now evacuated and motor 15 started whereby preform 14 rotates.

The etching is carried out by actuating ion source 11. This bombards the surface of the preform with argon ions causing its surface layers to be removed. These layers tend to be more contaminated than the bulk of the preform. While this removal of contamination is desirable in its own right the main purpose of the etch is to provide a clean surface whereby the properties of the coating, e.g. its adhesion, are substantially improved. Etching is conveniently carried out at energies of 300-600 eV and ion flow rates equivalent to 50 to 150 mA for about 15 to 60 minutes. When the etch is complete ion source 11 is switched off. This etch corresponds to stage (a) of the invention as specified above.

The deposition, ie stage (b) of the invention as specified above, is carried out by switching on ion source 12 to bombard target 13, i.e. the chalcogenide glass. This bombardment generates a secondary beam of particles, in toto representing the composition of target 13, which impingess on the precursor 14 where it deposits to form a uniform coating. (There is, of course, little deposition on the side away from target 13 but the rotation of preform 14 distributes the coatings sufficiently evenly.) Deposition is conveniently carried out at energy levels of 100 to 2000 eV at ion flow rates equivalent to 10 to 200 mA for 5 to 60 minutes. The energy level and ion flow rate relate to the ion stream from ion source 12, i.e. to the bombardment of target 13.

The coating of two similar preforms will now be described. Each of the two preforms was made from halide glass based on Zr $F_4$ and each had the same dimensions, namely:

| Length | 12 cm |
| Diameter | 1 cm |
| Core:cladding | 1:2 |

(The ratio of core to cladding is the ratio of their diameters).

These two preforms were etched and coated as follows:

|  | A | B |
| --- | --- | --- |
| Etching |  |  |
| Time (mins) | 38 | 42 |
| Energy (eV) | 500 | 500 |
| Flow rate (mA) | 100 | 85 |
| Coating |  |  |
| Time (mins) | 20 | 21 |
| Energy (eV) | 1000 | 544 |
| Flow rate (mA) | 47 | 55.4 |
| Estimated Coating thickness (nm) | 300 | 300 |

After coating each of the two preforms was drawn, under conventional conditions, at draw ratio 67:1 to generate a multimode fibre with outer diameter 150 μm. The coating thickness on the fibre was approximately 4 nm.

The follwing two points should be noted:
(a) It is important that there be no "bare" patches, i.e. that the coating be complete. Otherwise the uniformity of the coating is not important.
(b) The target 13, in each example, as a chalcogenide glass consisting of Ge, As and Se. The ratio of these elements as chosen so that the coating matched the viscosity of its substrate during the draw. Viscosity match is a conventional feature of drawing.

I claim:

1. A halide glass optical fibre having a barrier coating of chalcogenide glass on its surface, said barrier coating having a thickness of not more than 2 μm.

2. A fibre according to claim 1, wherein the thickness is 0.1 to 500 nm.

3. A fibre according to claim 2, wherein the thickness is 2 to 100 nm.

4. A fibre according to claim 1, in which the fibre comprises a core of one fluoride glass composition and a cladding of a different fluoride glass composition, both compositions comprising fluorides of Zr, Ba, La, Al, Na, Li and Pb.

5. A fibre according to claim 1, wherein the chalcogenide glass is based on compounds of at least one of S, Se and Te with at least one of Ge and As.

6. A fibre according to claim 2, in which the fibre comprises a core of one fluoride glass composition and a cladding of a different fluoride glass composition, both compositions comprising fluorides of Zr, Ba, La, Al, Na, Li and Pb.

7. A fibre according to claim 3, in which the fibre comprises a core of one fluoride glass composition and a cladding of a different fluoride glass composition, both compositions comprising fluorides of Zr, Ba, La, Al, Na, Li and Pb.

8. A fibre according to claim 2, wherein the chalcogenide glass is based on compounds of at least one of S, Se and Te with at least one of Ge and As.

9. A fibre according to claim 3, wherein the chalcogenide glass is based on compounds of at least one of S, Se and Te with at least one of Ge and As.

10. A fibre according to claim 4, wherein the chalcogenide glass is based on compounds of at least one of S, Se and Te with at least one of Ge and As.

11. A fibre preform which comprises a core precursor of one halide glass composition and a cladding precursor of a different halide glass composition, said preform having a barrier coating of chalcogenide glass on its surface, said barrier coating having a thickness of not more than 50 μm.

* * * * *